(12) United States Patent
Yamaguchi

(10) Patent No.: US 12,026,498 B2
(45) Date of Patent: Jul. 2, 2024

(54) CONTROL SYSTEM, MOBILE OBJECT, CONTROL METHOD, AND COMPUTER-READABLE STORAGE MEDIUM

(71) Applicant: HONDA MOTOR CO., LTD., Tokyo (JP)

(72) Inventor: Kohei Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/570,353

(22) Filed: Jan. 6, 2022

(65) Prior Publication Data
US 2022/0222059 A1 Jul. 14, 2022

(30) Foreign Application Priority Data
Jan. 13, 2021 (JP) .................................. 2021-003352

(51) Int. Cl.
*G06F 8/65* (2018.01)
*G06F 8/61* (2018.01)
*H04W 4/40* (2018.01)
*H04W 84/12* (2009.01)

(52) U.S. Cl.
CPC .................. *G06F 8/65* (2013.01); *G06F 8/61* (2013.01); *H04W 4/40* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 6,611,755 | B1* | 8/2003 | Coffee | B28C 9/00 455/526 |
| 8,875,123 | B2* | 10/2014 | Shiba | G06F 8/65 717/173 |
| 9,524,160 | B2* | 12/2016 | Takahashi | G06F 13/00 |
| 9,600,261 | B2* | 3/2017 | Mandyam | G06F 8/65 |
| 10,324,703 | B2* | 6/2019 | Choi | G06F 8/65 |
| 2004/0214599 | A1* | 10/2004 | Ogino | H04M 1/72406 455/556.1 |
| 2011/0307583 | A1* | 12/2011 | Iwaya | G06F 8/61 709/219 |
| 2016/0364225 | A1* | 12/2016 | Moeller | H04L 67/12 |
| 2018/0074811 | A1* | 3/2018 | Kiyama | H04L 67/59 |
| 2018/0321047 | A1* | 11/2018 | Sagawa | H04W 4/02 |
| 2019/0212997 | A1* | 7/2019 | Sangameswaran | H04L 67/52 |
| 2021/0191661 | A1 | 6/2021 | Harata | |
| 2022/0222058 | A1* | 7/2022 | Taki | G06F 8/65 |

FOREIGN PATENT DOCUMENTS

JP 2020027666 A 2/2020

* cited by examiner

*Primary Examiner* — Marina Lee

(57) ABSTRACT

A control system comprises a mobile object control unit for controlling a mobile object; and an update control unit for controlling receiving an update program of the mobile object control unit by means of wireless communication and controlling instructing to update a control program of the mobile object control unit, wherein when a power switch of the mobile object is turned off during receiving the update program, the update control unit is for: continuing receiving the update program, provided that receiving the update program is predicted to be completed within a predetermined time; and stopping receiving the update program if receiving the update program is predicted not to be completed within the predetermined time.

20 Claims, 7 Drawing Sheets

| LOCATION | COMMUNICATION SPEED |
|---|---|
| LOCATION 1 | 45Mbps |
| LOCATION 2 | 15Mbps |
| LOCATION 3 | 35Mbps |

FIG.5

CONTROL SYSTEM, MOBILE OBJECT, CONTROL METHOD, AND COMPUTER-READABLE STORAGE MEDIUM

The contents of the following Japanese patent application(s) are incorporated herein by reference: NO. 2021-003352 filed on Jan. 13, 2021.

BACKGROUND

1. Technical Field

The present invention relates to a control system, a mobile object, a control method, and a computer-readable storage medium.

2. Related Art

Patent document 1 discloses an ECU where an application program can be rewritten, as an ECU for a vehicle.

PRIOR ART DOCUMENT

Patent Document

[Patent Document 1] Japanese Patent Application Publication No. 2020-27666.

BRIEF DESCRIPTION OF THE DRAWINGS

FIG. 5 illustrates an example of a data structure of connection location information stored by a location information storage unit 260.

DESCRIPTION OF EXEMPLARY EMBODIMENTS

Hereinafter, the present invention will be described through embodiments of the invention, but the following embodiments do not limit the invention according to the claims. In addition, not all of the combinations of features described in the embodiments are essential to the solving means of the invention.

Figure 1:
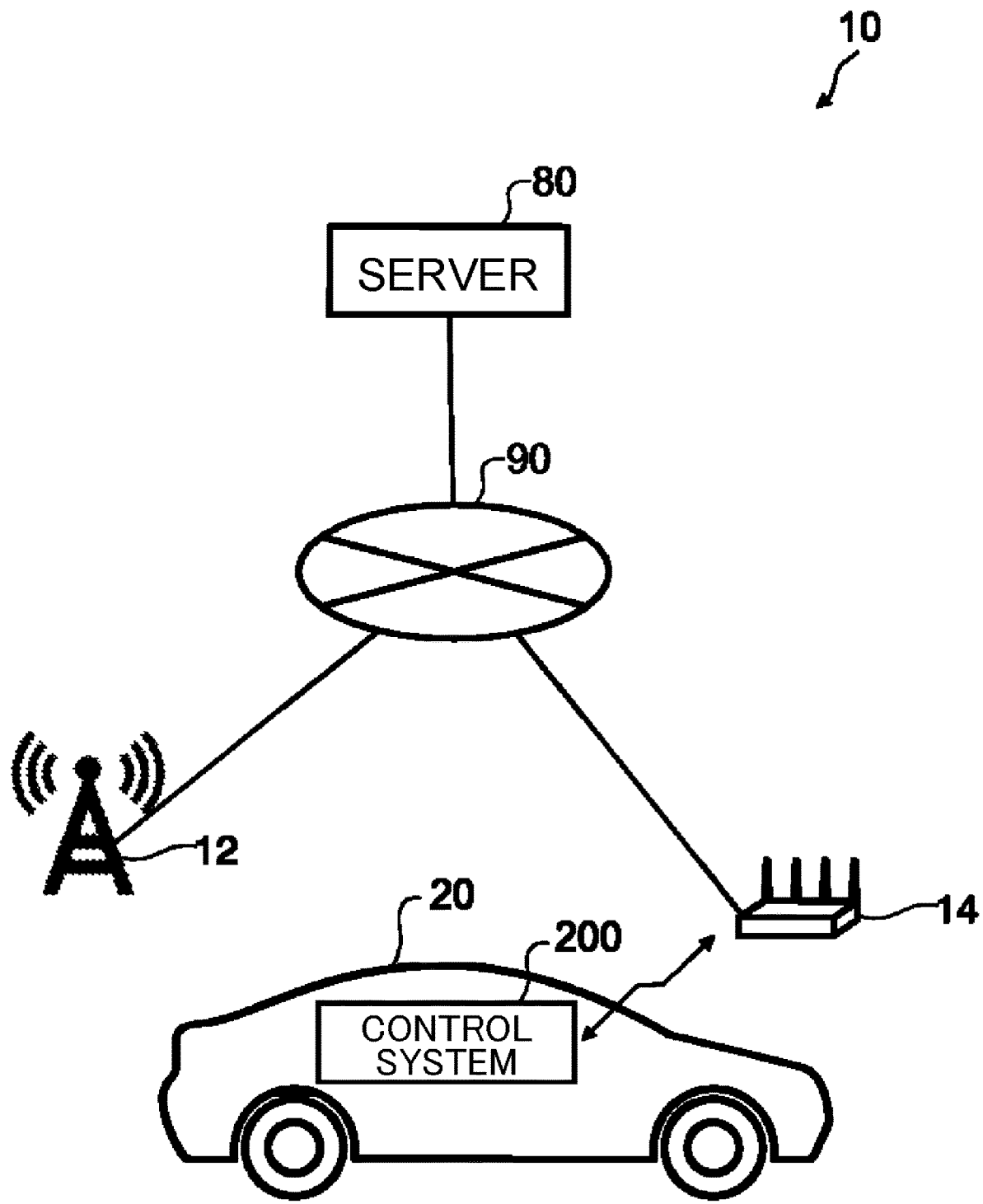
FIG. 1 schematically illustrates an updating system 10 according to an embodiment.

FIG. 1 schematically illustrates an updating system 10 according to an embodiment. The updating system 10 includes a vehicle 20 and a server 80. The vehicle 20 includes a control system 200. The control system 200 is responsible for the control of the vehicle 20 and the communication with a server 80 via a communication network 90. The communication network 90 includes an IP network of the Internet or the like, a P2P network, a private line including VPN, virtual network, mobile communication network, and the like.

A base station 12 and a wireless access point 14 are connected to the communication network 90. The base station 12 is a base station belonging to the mobile communication network. The wireless access point 14 is a wireless LAN access point, for example. The wireless access point 14 may be, for example, a wireless LAN router at the house of a user of the vehicle 20. The wireless access point 14 may be a public wireless LAN access point. The wireless access point 14 may be a wireless access point installed in transportation infrastructure. The wireless access point 14 may be a wireless access point installed in a facility provided close to transportation infrastructure. The wireless access point 14 may be a wireless access point installed in a parking lot or the like.

In the vehicle 20, the control system 200 has a mobile communication function and a wireless LAN communication function. The control system 200 includes an ECU (Electronic Control Unit) for controlling the vehicle 20. The control system 200 receives, from the server 80 through the communication network 90, an update program for performing a program update of each ECU included in the control system 200, by means of wireless communication via the base station 12 or the wireless access point 14. The control system 200 performs reprogramming to each ECU by means of the received update program. The reprogramming is performed for the purpose of upgrading functions of the ECU included in the control system 200 or the like. Thus, the control system 200 updates the ECU by performing reprogramming of the ECU by OTA (Over The Air).

For example, when the vehicle 20 arrives at the house of the user, the control system 200 becomes automatically connected to the communication network 90 through the wireless LAN router at the house. After being informed of the presence of the update program by the server 80, the control system 200 starts downloading the update program from the server 80. Now, when the user turns off the IG (ignition) power of the vehicle 20, the control system 200 predicts the time required for completing downloading the update program. When the time required for completing the downloading is 10 minutes or less, even if the IG power is turned off, the control system 200 maintains the wireless LAN communication function of the control system 200 for up to 10 minutes, and continues downloading the update program. When the downloading of the update program is completed, the control system 200 stops the wireless LAN communication function of the control system 200.

According to the controlling by the control system 200, even when the user arrives at a place where the wireless access point 14 is accessible and turns off the IG power, the downloading of the update program can continue. Therefore, the opportunity for downloading the update program can be increased. This enables, for example, an important program update to be rapidly applied to the vehicle 20. Also, by setting a maximum time for continuing the downloading, unnecessary consumption of electrical power of the battery mounted on the vehicle 20 can suppressed.

Figure 2:
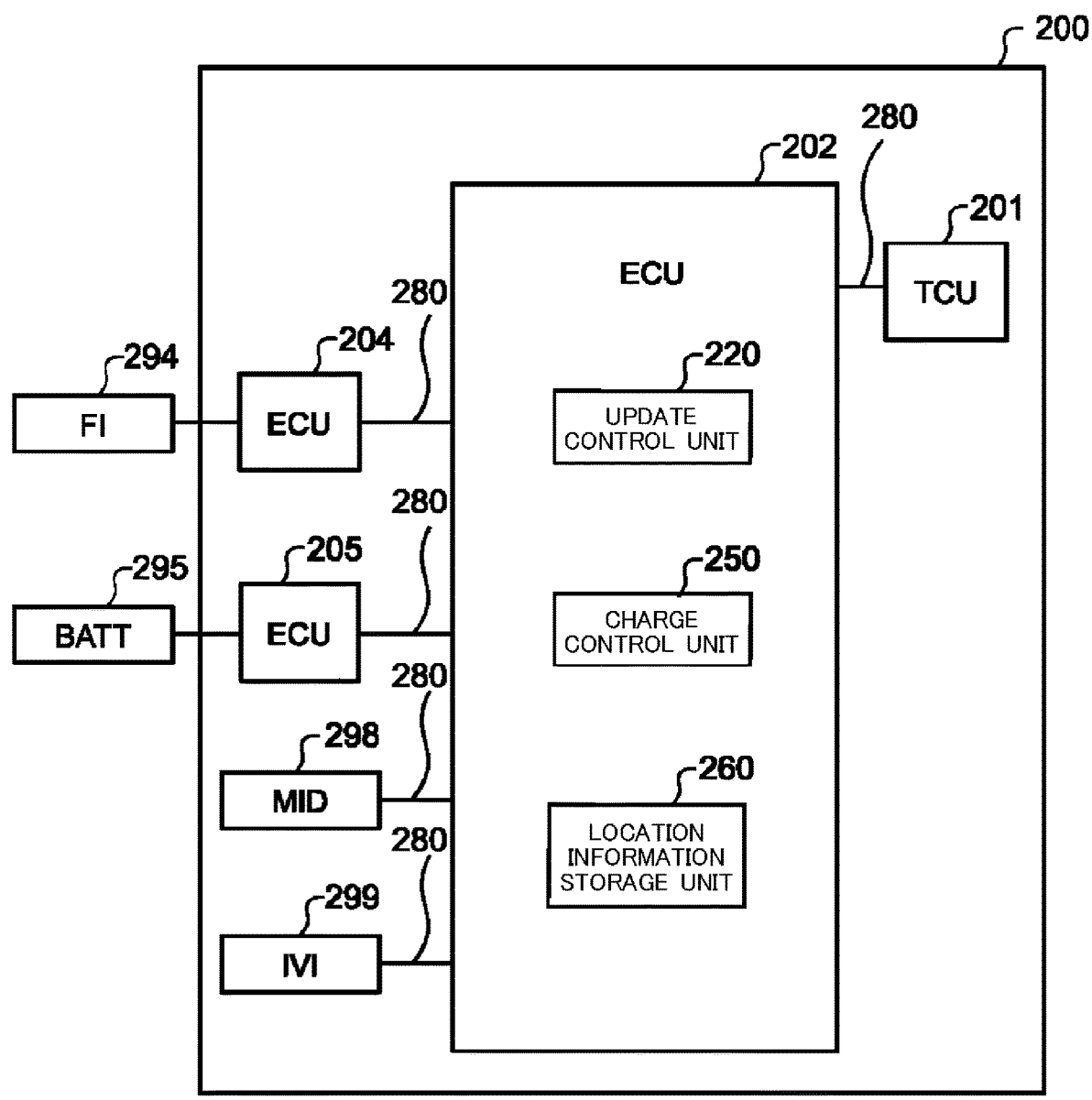
FIG. 2 schematically illustrates a system configuration of a control system 200.

FIG. 2 schematically illustrates a system configuration of a control system 200. The control system 200 includes a TCU 201, an ECU 202, an ECU 204, an ECU 205, a MID 298, and an IVI 299.

The ECU 202 is connected to the TCU 201, the ECU 204, and the ECU 205 through an in-vehicle communication line 280. The TCU 201, the ECU 204, and the ECU 205 mutually communicate through the in-vehicle communication line 280 and the ECU 202. The ECU 202 performs general controls over the TCU 201, the ECU 204, and the ECU 205.

The in-vehicle communication line 280 may be configured to include, for example, a CAN (Controller Area Network), an Ether network or the like.

The TCU 201 is a Telematics Control Unit. The TCU 201 is mainly responsible for the mobile communication. The TCU 201 sends and receives data with the server 80 according to the control by the ECU 202. The TCU 201 is an example of a communication unit.

The MID 298 is a multi-information display. The IVI 299 is, for example, a piece of in-vehicle infotainment information equipment (IVI). The MID 298 and the IVI 299 are connected to the ECU 202 via the in-vehicle communication line 280. The MID 298 and the IVI 299 may function as display control units. The IVI 299 includes a wireless LAN communication function. The IVI 299 receives the update program from the server 80 by means of the wireless LAN communication according to the control by the ECU 202.

The ECU 204 and the ECU 205 each are a vehicle control unit for controlling the vehicle 20. The ECU 204 and the ECU 205 are an example of a "mobile object control unit. The ECU 204 and the ECU 205 control various pieces of equipment mounted on the vehicle 20. For example, the ECU 204 controls an FI 294 which is a fuel injection device. The ECU 205 controls a BATT 295 which is a high-voltage battery.

Although a system configuration where the control system 200 includes the TCU 201, the ECU 202, the ECU 204, and the ECU 205 is illustrated in the present embodiment, the system configuration of the control system 200 is not limited to the example of the present embodiment. Also, although a possible target ECU for the program update is the ECU 204 by way of illustration in the present embodiment, the possible target ECU for the program update is not limited to those ECU. It should be noted that the ECU 202 functions as an update control unit for controlling the program update of the ECU 204.

The update control unit 220 performs controlling by controlling receiving the update program of the ECU 204 by means of wireless communication and by instructing to update the control program of the ECU 204. For example, the update control unit 220 instructs to write the update program to a program storage area of the ECU 204. Also, the update control unit 220 instructs to perform a setting such that the update program written to the program storage area is loaded upon startup.

When a power switch of the vehicle 20 is turned off during receiving the update program, the update control unit 220 continues receiving the update program, provided that receiving the update program is predicted to be completed within a predetermined time, and stops receiving the update program, provided that receiving the update program is predicted not to be completed within a predetermined time. The power switch is, for example, an ignition switch.

The update control unit 220 continues receiving the update program if receiving the update program is predicted to be completed within a predetermined time based on a reception throughput of the update program and the amount of unreceived data of the update program.

The update control unit 220 may be capable of controlling receiving the update program in a plurality of communication schemes. When a power switch of the vehicle 20 is turned off during receiving the update program in a predetermined first communication scheme among the plurality of communication schemes, the update control unit 220 may continue receiving the update program, provided that receiving the update program is predicted to be completed within a predetermined time in the first communication scheme, and may stop receiving the update program if receiving the update program is predicted not to be completed within a predetermined time first communication scheme. When the power switch of the vehicle 20 is turned off during receiving the update program in a predetermined second communication scheme among a plurality of communication schemes, the update control unit 220 may stop receiving the update program.

For example, the first communication scheme is a wireless LAN scheme, and the second communication scheme is a mobile communication scheme. However, the first communication scheme may be the mobile communication scheme, and the second communication scheme may be the wireless LAN scheme. As long as the first communication scheme and the second communication scheme are wireless communication schemes different from each other, any wireless communication scheme can be applied.

When the power switch of the vehicle 20 is turned off while a connection in the first communication scheme is not established, the update control unit 220 may wait for the connection in the first communication scheme to be established until a predetermined time for establishing the connection in the first communication scheme elapses. If receiving the update program has not been completed within the predetermined time after the update control unit 220 continues receiving the update program when the power switch of the vehicle 20 is turned off, the update control unit 220 stops receiving the update program.

When the destination of the vehicle 20 is in an area where the first communication scheme can be used for the communication, a charge control unit 250 may charge a battery for supplying electrical power used in updating the ECU 204 with the update program. The charge control unit 250 may charge the battery when the target destination set in a navigation device of the vehicle 20 is at a location in the area where the first communication scheme can be used for the communication. It should be noted that the battery for supplying the electrical power used in updating the ECU 204 with the update program may be, for example, a low-voltage battery for accessory power mounted on the vehicle 20. If the vehicle 20 includes a high-voltage battery for driving a motor, the high-voltage battery may be used for charging the low-voltage battery. If the vehicle 20 includes an internal combustion engine and a generator, electrical power obtained by driving the generator by means of the internal combustion engine may be used for charging the low-voltage battery.

The location information storage unit 260 stores the history of location information where the connection in the first communication scheme is established. The location information storage unit 260 may be achieved by a non-volatile memory mounted on the ECU 202. The charge control unit 250 may determine whether the destination of the vehicle 20 is in the area where the first communication scheme can be used for the communication based on location information stored in the location information storage unit 260 and current location information of the vehicle 20. This enables appropriately predicting whether the first communication scheme can be used for the communication when the vehicle 20 arrives at the target destination, and therefore when the vehicle 20 arrives at the target destination the battery can be charged with the electrical power.

Figure 3:
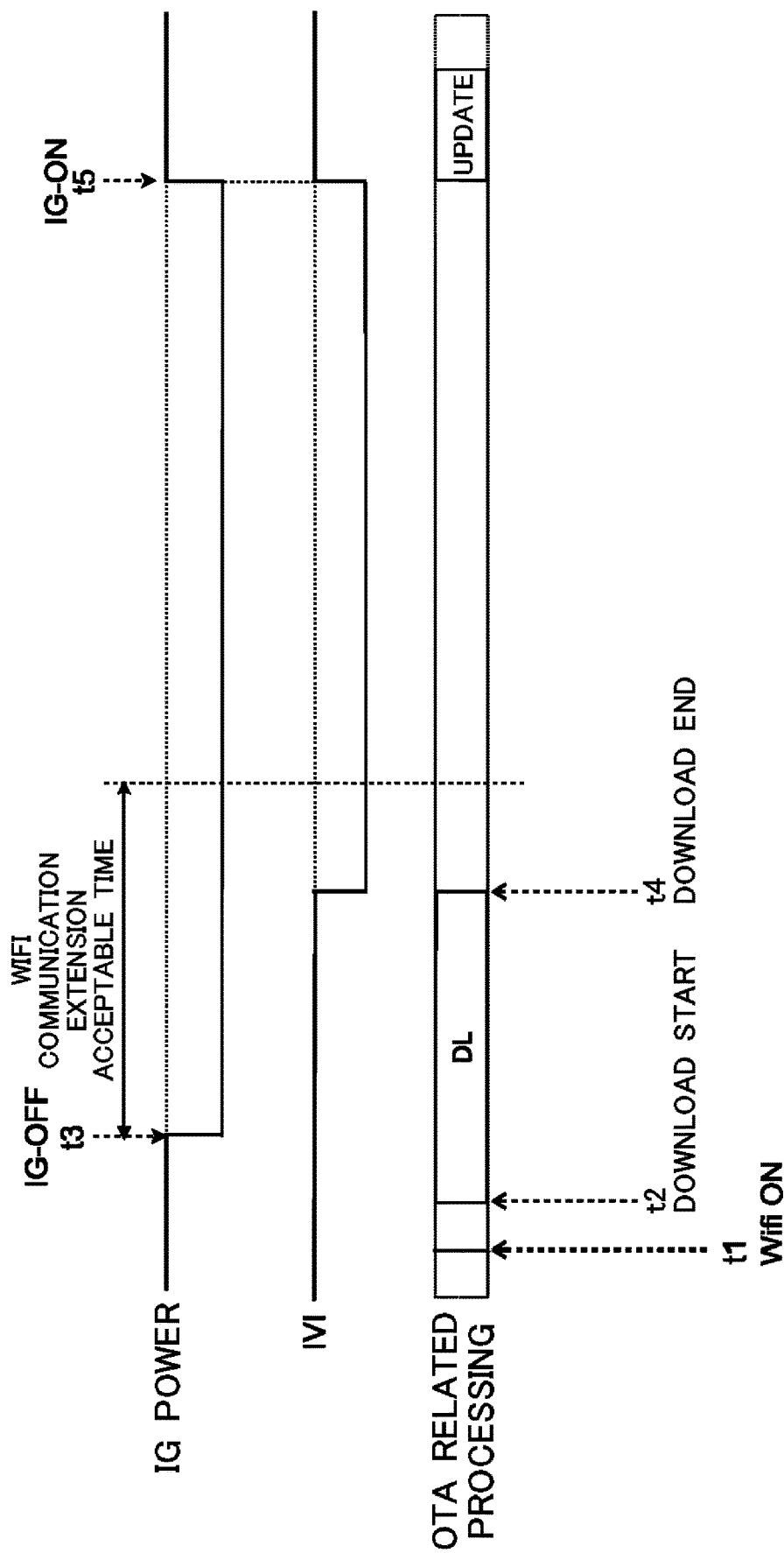
FIG. 3 schematically illustrates a time chart of the downloading of an update program of an update program.

FIG. 3 schematically illustrates a time chart of the downloading of an update program of an update program. FIG. 3 illustrates an IG power state, an operational state of the wireless LAN communication function of the IVI 299, and a running state of an OTA-related processing executed by the control system 200. In an embodiment below, a description is given on the case where the first communication scheme is the wireless LAN communication (WiFi communication) scheme.

At time t1, the WiFi connection is established. For example, when the vehicle 20 arrives at the house of the user, the IVI 299 performs the wireless LAN connection with a wireless LAN router of the house. When the update control unit 220 is informed of the presence of the update program by the server 80, at time t2, the update control unit 220 starts downloading the update program from the server 80 by means of a wireless LAN function of the IVI 299. After time t2, the user turns off the IG power at time t3.

The update control unit 220 calculates a throughput for the downloading of the update program starting at time t2 to calculate the download time required for completing receiving the update program based on the throughput and the amount of unreceived data of the update program. When the download time is less than a predetermined WiFi communication extension acceptable time, the update control unit 220 maintains the wireless LAN function of the IVI 299 to continue downloading the update program.

At time t4, when the downloading the update program is completed, the update control unit 220 causes the power state of the IVI 299 to be a complete off-state to stop the wireless LAN function of the IVI 299. At time t5, when the IG power is turned on, the update control unit 220 controls the IVI 299 and the MID 298 to inform the user of the presence of the update program to instruct the ECU 204 the update of the update program according to the instruction of the user.

It should be noted that the WiFi communication extension acceptable time is, for example, 10 seconds. The WiFi communication extension acceptable time is preferably less than 120 seconds. If the WiFi communication extension acceptable time is excessively long, the consuming electrical power of the battery increases, which may accelerate the deterioration of the low-voltage battery. If the WiFi communication extension acceptable time is excessively short, the opportunity to download the update program is decreased, which may results in delayed application of an important update program.

Figure 4:
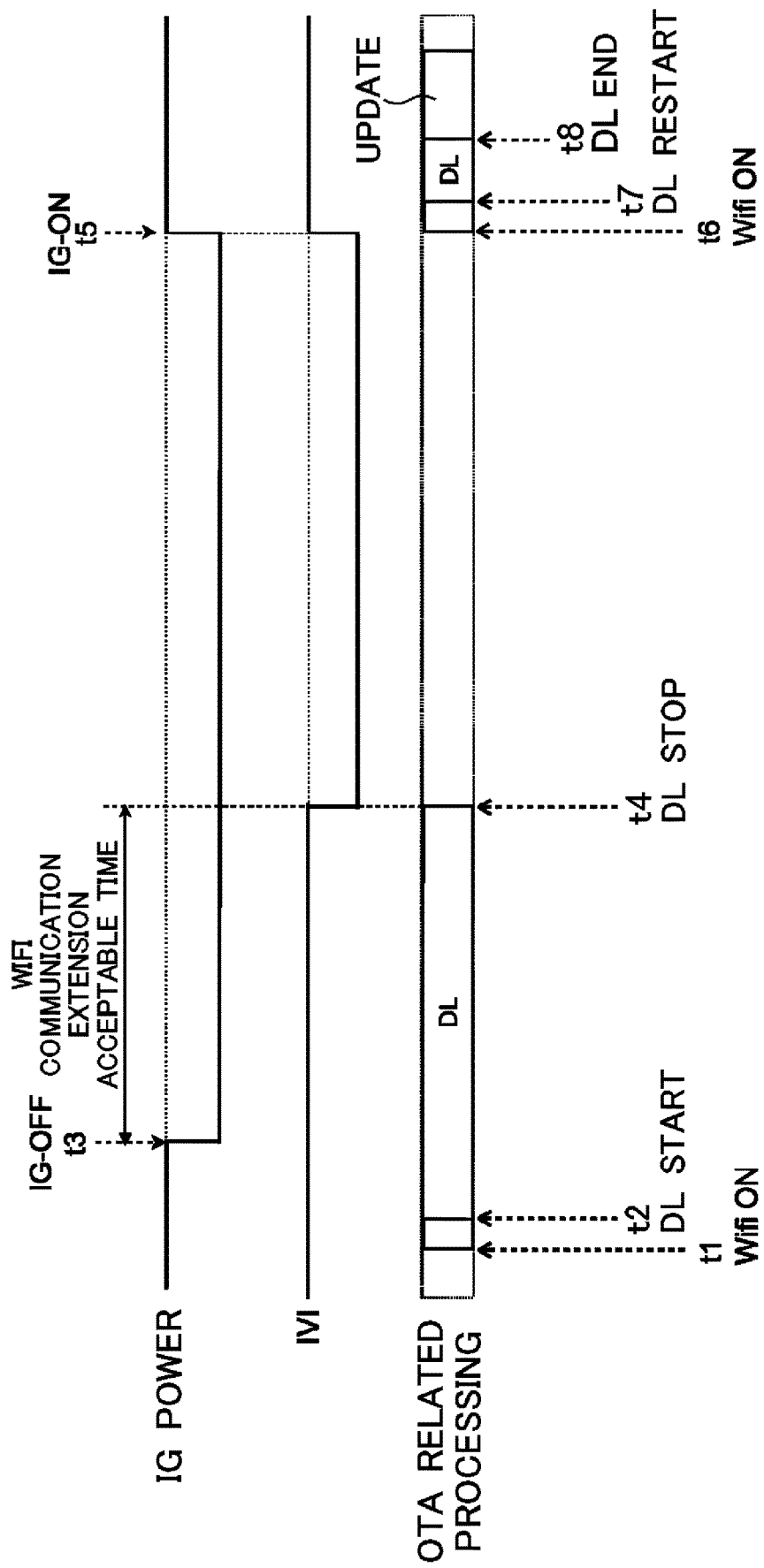
FIG. 4 schematically illustrates another example of the time chart of the downloading of an update program.

FIG. 4 schematically illustrates another example of the time chart of downloading the update program. Similarly to FIG. 3, FIG. 4 illustrates an IG power state, an operational state of the wireless LAN communication function of the IVI 299, and a running state of an OTA-related processing executed by the control system 200.

The time chart from time t1 to t3 is the same as the time chart of FIG. 3. In other words, the WiFi connection is established at time t1, the downloading of the update program by means of the wireless LAN function of the IVI 299 starts at time t2, and the IG power is turned off at time t3. Also, the update control unit 220 calculates the download time required for completing receiving the update program to determine the download time is less than a predetermined WiFi communication extension acceptable time, and maintains the wireless LAN function of the IVI 299 to continue downloading the update program.

The time chart of FIG. 4 is a time chart where the downloading the update program is not completed within the WiFi communication extension acceptable time, which is different from the prediction of the time for downloading the update program. As illustrated in FIG. 4, if the WiFi communication extension acceptable time elapses after time t3, the update control unit 220 causes the power state of the IVI 299 to be a complete off-state to stop the wireless LAN function of the IVI 299 at time t4. This enables interrupting the downloading of the update program.

When the IG power is turned on at time t5, the WiFi connection is established at time t6, the downloading of the update program restarts by means of the wireless LAN function of the IVI 299 time t7, and the downloading is completed at time t8. When the downloading of the update program is completed, the update control unit 220 controls the IVI 299 and the MID 298 to inform the user of the presence of the update program to instruct the ECU 204 the update of the update program according to the instruction of the user.

FIG. 5 illustrates an example of a data structure of connection location information stored by a location information storage unit 260. The connection location information includes a "location" and a "communication speed" as data items. The "location" is geographical location information where the IVI 299 has successfully established the wireless LAN connection in the past. The "communication speed" is a communication speed of the wireless LAN communication successfully performed by the WI 299.

The charge control unit 250 predicts whether the wireless LAN connection can be established at a predicted target destination of the vehicle 20 based on the past travelling history of the vehicle 20 and current location of the vehicle 20 detected by means of a GPS function, and the connection location information. If it is determined that the wireless LAN connection can be established at the target destination of the vehicle 20, the low-voltage battery is charged to have the remaining capacity more than a predetermined value while the vehicle 20 is driving. For example, the charge control unit 250 may charge the low-voltage battery for accessory power from the high-voltage battery for driving. This can decrease the possibility that the wireless LAN function of the IVI 299 cannot be maintained due to the lack of remaining amount of the low-voltage battery at a place where the wireless LAN connection can be established. It should be noted that the charge control unit 250 may perform charging to cause the remaining capacity of the low-voltage battery to be more than a predetermined value, provided that the communication speed of the wireless LAN communication of the target destination of the vehicle 20 is predicted to be faster than a predetermined value based on the connection location information.

Figure 6:
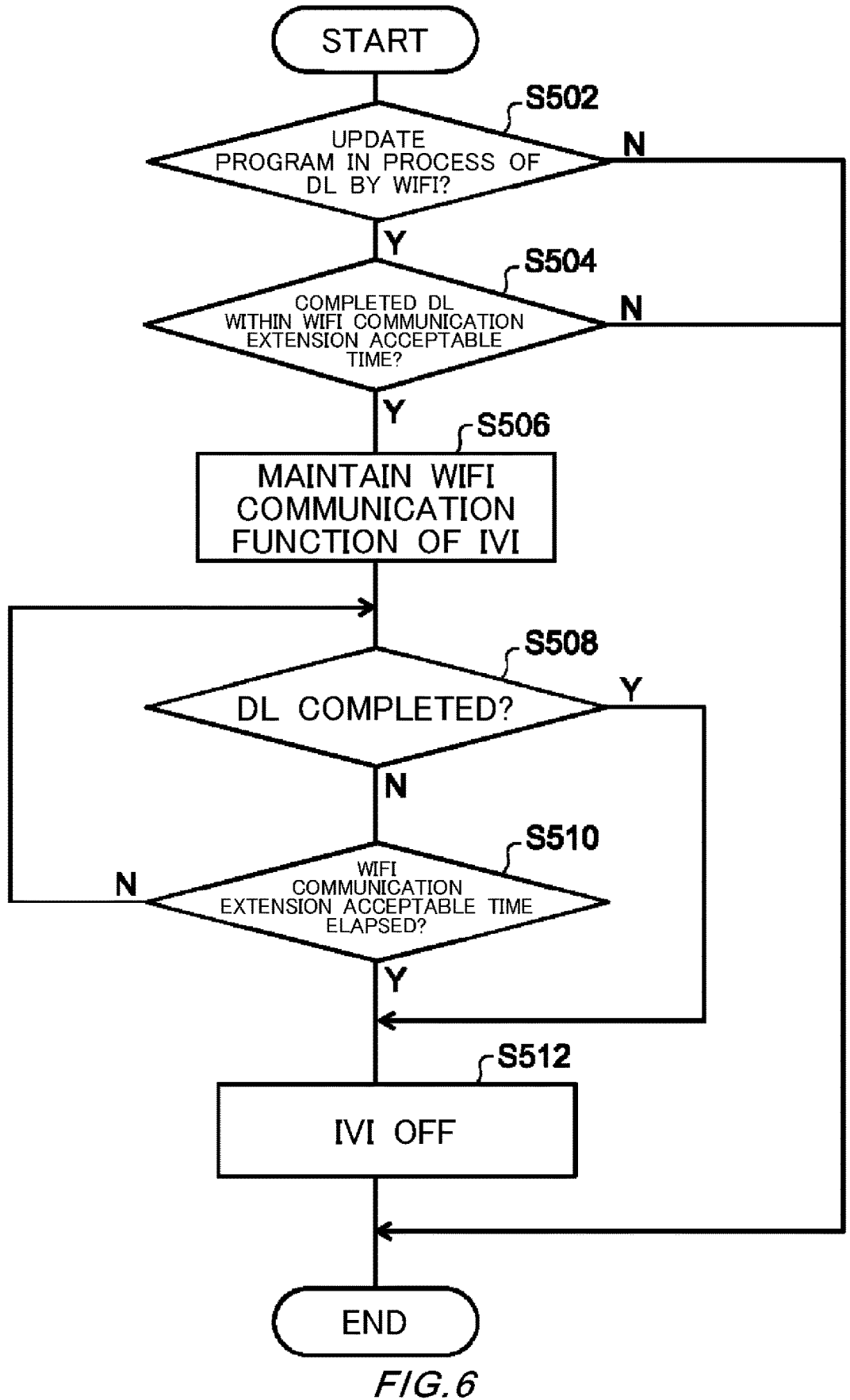
FIG. 6 is a flow chart illustrating a processing procedure related to a control method executed by the control system 200.

FIG. 6 is a flow chart illustrating a processing procedure related to a control method executed by the control system 200. The process of the present flowchart starts when the IG power of the vehicle 20 is turned off by the operation of the user.

In S502, the update control unit 220 determines whether the update program is in the process of downloading the update program by means of the wireless LAN communication. If the wireless LAN communication is not in the process of downloading the update program, the process of the present flowchart ends. If the wireless LAN communication is in the process of downloading the update program, in S504, whether the update program can be downloaded within the WiFi communication extension acceptable time is determined. If the update program cannot be downloaded within the WiFi communication extension acceptable time, the process of the present flowchart ends. If the update program can be downloaded within the WiFi communication extension acceptable time, in S506, the update control unit 220 maintains the wireless LAN communication function of the IVI 299. At this time, the update control unit 220 may stop the function other than the wireless LAN communication function of the IVI 299.

Then, in S508, the update control unit 220 determines whether the downloading the update program has been completed. When downloading the update program has been completed, the process proceeds to S512. When the downloading the update program is not completed, whether the WiFi communication extension acceptable time has elapsed is determined in S510. If the WiFi communication extension acceptable time has not elapsed, the process proceeds to S508. If the WiFi communication extension acceptable time has elapsed, the process proceeds to S512.

In S512, the update control unit 220 stops the wireless LAN function of the IVI 299 and causes the power state of the IVI 299 to be a completely off-state, and the process of the present flowchart ends.

In the above embodiments, when the IG power is turned off, if downloading the update program is performed by means of the wireless LAN communication of the IVI 299. The downloading by means of the wireless LAN communication is continued. As a variation of the present embodiment, when the switch of the IG power is turned off, if the wireless LAN connection of the IVI 299 is not established, the wireless LAN function of the IVI 299 is maintained for a predetermined time, if the wireless LAN connection has been established within a predetermined time, downloading the update program may be performed for up to the WiFi communication extension acceptable time. For example, when the vehicle 20 stops at a place where the wireless LAN connection is possible, if the user immediately turns the power switch off before the wireless LAN connection of the IVI 299 is established, it is possible that the update program cannot be downloaded by a wireless LAN. Therefore, it can be expected that maintaining the wireless LAN function of the IVI 299 for a predetermined time after the switch of the IG power is turned off can increase the opportunity to download the update program.

According to above-mentioned embodiments, even if the IG power is turned off when arriving at a place where the wireless LAN communication is possible, downloading the update program can be continued. Therefore the opportunity to download the update program can be increased. Also, by setting for an acceptable time for continuing the downloading, the unnecessary consumption of electrical power of the battery mounted on the vehicle 20 can suppressed.

Figure 7:
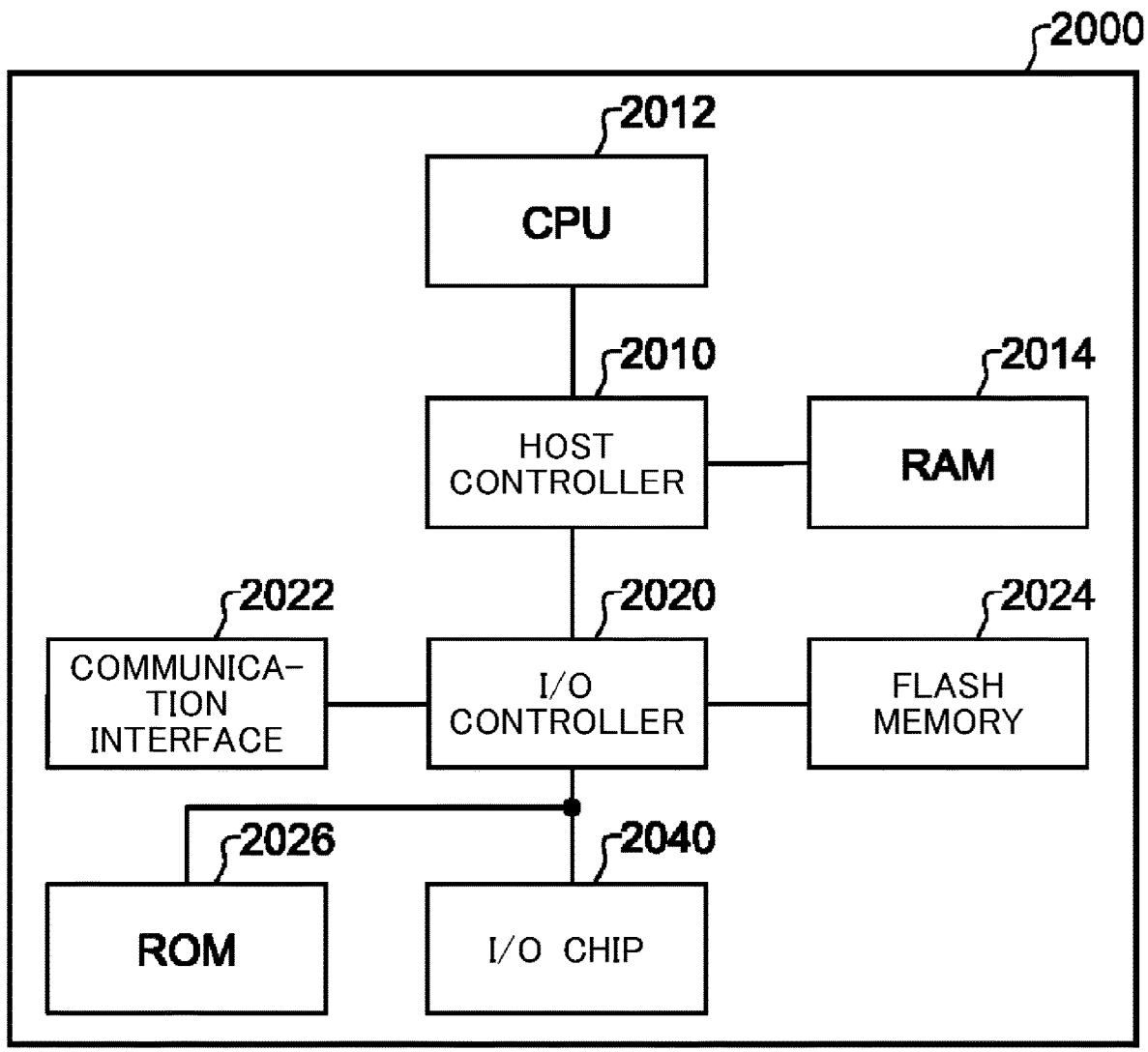
FIG. 7 illustrates an example of a computer 2000.

FIG. 7 illustrates an example of a computer 2000 in which a plurality of embodiments of the present invention may be entirely or partially embodied. A program installed in the computer 2000 can cause the computer 2000 to function as a system or an apparatus such as a control system according to the embodiments or each unit of the system or the apparatus, to execute operation associated with each unit, and/or to execute a process according to the embodiments or a step of the process. Such a program may be executed by a CPU 2012 in order to cause the computer 2000 to execute a specific operation associated with some or all of the processing procedures and the blocks in the block diagram described herein.

The computer 2000 according to the present embodiment includes the CPU 2012 and RAM 2014, which are mutually connected by a host controller 2010. The computer 2000 also includes ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units, such as a keyboard, a mouse, and a monitor, to the input/output controller 2020 via an input/output port such as a serial port, a parallel port, a keyboard port, a mouse port, a monitor port, a USB port, or an HDMI (registered trademark) port.

The programs are provided through a computer-readable storage medium, such as a CD-ROM, a DVD-ROM, or a memory card, or via a network. The RAM 2014, the ROM 2026, or the flash memory 2024 is an example of the computer-readable storage medium. The programs are installed in the flash memory 2024, the RAM 2014 or the ROM 2026, and are executed by the CPU 2012. Information processing described in those programs is read by the computer 2000, and provides cooperation between the programs and the above-described various types of hardware resources. The apparatus or method may be configured by achieving operation or processing of information according to a use of the computer 2000.

For example, when communication is performed between the computer 2000 and an external device, the CPU 2012 may execute a communication program loaded in the RAM 2014, and instruct the communication interface 2022 to execute communication processing based on the processing written in the communication program. The communication interface 2022, under control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Also, the CPU 2012 may cause all or a necessary portion of a file or a database stored in the recording medium such as the flash memory 2024 or the like, to be read by the RAM 2014, and may execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described herein and specified by instruction sequences of the programs, and writes back the results into the RAM 2014. Also, the CPU 2012 may retrieve information in a file, a database, or the like in the recording medium. For example, in a case where a plurality of entries, each having an attribute value of a first attribute associated with an attribute value of a second attribute, are stored in the recording medium, the CPU 2012 may retrieve, out of the plurality of entries, an entry with the attribute value of the first attribute specified that meets a condition, read the attribute value of the second attribute stored in said entry, and thereby obtain the attribute value of the second attribute associated with the first attribute meeting a predetermined condition.

The above-described programs or software module may be stored on the computer 2000 or in the computer-readable storage medium in the vicinity of the computer 2000. A recording medium such as a hard disk or RAM provided in a server system connected to a dedicated communication network or the Internet can be used as the computer-readable storage medium. The programs stored in the computer-readable storage medium may be provided to the computer 2000 via the network.

The program that is installed in the computer 2000 and that causes the computer 2000 to function as the control system 200 may instruct the CPU 2012 or the like to cause the computer 2000 to function as each unit of the control system 200. The information processing described in those programs are read by the computer 2000, thereby serving as each unit of the control system 200, which is specific means realized by the cooperation of software and the various types of hardware resources mentioned above. Then, those specific means achieves the computation or processing of information corresponding to the intended use of the computer 2000 according to this embodiment, so that the a specific control system 200 is constructed as a specific one corresponding to the intended use.

Various embodiments have been described with reference to the block diagrams and the like. In the block diagram, each block may represent (1) a step of a process in which an operation is executed, or (2) each unit of the apparatus responsible for executing the operation. Specific steps and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable storage medium may include any tangible device capable of storing an instruction executed by an appropriate device. As a result, the computer-readable storage medium having the instruction stored thereon constitutes at least a part of a product including an instruction that may be executed in order to provide a means to execute an operation specified by a processing procedure or a block diagram. Examples of the computer-readable storage medium may include an electronic storage medium, a magnetic storage medium, an optical storage medium, an electromagnetic storage medium, a semiconductor storage medium, or the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

The computer-readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of processors include computer processors, processing units, microprocessors, digital signal processors, controllers, microcontrollers, or the like.

Although the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: updating system
12: base station
14: wireless access point
20: vehicle
80: server
90: communication network
200: control system
201: TCU
202: ECU
204: ECU
205: ECU
220: update control unit
250: charge control unit
260: location information storage unit
280: in-vehicle communication line
294: FI
295: BATT
298: MID
299: IVI
2000: computer
2010: host controller
2012: CPU
2014: RAM 2020: input/output controller
2022: communication interface
2024: flash memory
2026: ROM
2040: input/output chip

What is claimed is:

1. A control system comprising:
 at least one processor;
 a mobile object control unit that uses the at least one processor to control a mobile object; and
 an update control unit that uses the at least one processor to control receiving an update program of the mobile object control unit from a server remote from the mobile object, via a communication network, and instructing to update a control program of the mobile object control unit,
 wherein when a power switch of a motor that drives the mobile object is turned off during receiving the update program, the update control unit:
  continues receiving the update program from the server via the communication network provided that receiving the update program is predicted by the update control unit using the at least one processor to be completed within a predetermined time; and
  stops receiving the update program from the server via the communication network if receiving the update program is predicted by the update control unit using the at least one processor not to be completed within the predetermined time.

2. The control system according to claim 1, wherein the update control unit uses the at least one processor to continue receiving the update program if receiving the update program is predicted to be completed within the predetermined time based on a reception throughput of the update program and an amount of unreceived data of the update program.

3. The control system according to claim 1, wherein the mobile object is a vehicle, and the power switch is an ignition switch.

4. The control system according to claim 1, wherein the update control unit uses the at least one processor to control receiving the update program in a plurality of communication schemes;
 when the power switch of the mobile object is turned off during receiving the update program in a predetermined first communication scheme among the plurality of communication schemes, the update control unit uses the at least one processor to control continuing receiving the update program, provided that receiving the update program is predicted to be completed within a predetermined time in the first communication scheme, and stopping receiving the update program if receiving the update program is predicted not to be completed within the predetermined time in the first communication scheme; and
 the update control unit uses the at least one processor to control stopping receiving the update program if the power switch of the mobile object is turned off during receiving the update program in a predetermined second communication scheme among the plurality of communication schemes.

5. The control system according to claim 4, wherein the first communication scheme is a wireless LAN scheme, and the second communication scheme is a mobile communication scheme.

6. The control system according to claim 4, wherein when the power switch of the mobile object is turned off while a connection in the first communication scheme is not established, the update control unit uses the at least one processor to control waiting for an establishment of the connection in the first communication scheme until a predetermined time for establishing the connection in the first communication scheme elapses.

7. The control system according to claim 1, wherein if receiving the update program has not been completed within the predetermined time after the update control unit uses the at least one processor to control receiving the update program when the power switch of the mobile object is turned off, the update control unit is for stopping receiving the update program.

8. The control system according to claim 4, further comprising:
 a charge control unit that uses the at least one processor to charge a battery for supplying electrical power used in updating the mobile object control unit with the update program when a destination of the mobile object is in an area where the first communication scheme can be used for communication.

9. The control system according to claim 8, wherein the charge control unit uses the at least one processor to charge the battery when a target destination set in a navigation device of the mobile object is at a location in the area where the first communication scheme can be used for communication.

10. The control system according to claim 8, further comprising:
 a location information storage unit that uses the at least one processor to store a history of a location information where a connection in the first communication scheme is established,
 wherein the charge control unit uses the at least one processor to determine whether the destination of the mobile object is in the area where the first communication scheme can be used for communication based on the location information stored by the location information storage unit and current location information of the mobile object.

11. The control system according to claim 2, wherein the mobile object is a vehicle, and the power switch is an ignition switch.

12. The control system according to claim 2, wherein the update control unit uses the at least one processor to control receiving the update program in a plurality of communication schemes,
 when the power switch of the mobile object is turned off during receiving the update program in a predetermined first communication scheme among the plurality of communication schemes, the update control unit uses the at least one processor to control continuing receiving the update program, provided that receiving the update program is predicted to be completed within a predetermined time in the first communication scheme, and stopping receiving the update program if receiving the update program is predicted not to be completed within the predetermined time in the first communication scheme; and
 the update control unit uses the at least one processor to control stopping receiving the update program if the power switch of the mobile object is turned off during receiving the update program in a predetermined second communication scheme among the plurality of communication schemes.

13. The control system according to claim 3, wherein
the update control unit uses the at least one processor to control receiving the update program in a plurality of communication schemes,
when the power switch of the mobile object is turned off during receiving the update program in a predetermined first communication scheme among the plurality of communication schemes, the update control unit uses the at least one processor to control continuing receiving the update program, provided that receiving the update program is predicted to be completed within a predetermined time in the first communication scheme, and stopping receiving the update program if receiving the update program is predicted not to be completed within the predetermined time in the first communication scheme; and
the update control unit uses the at least one processor to control stopping receiving the update program if the power switch of the mobile object is turned off during receiving the update program in a predetermined second communication scheme among the plurality of communication schemes.

14. The control system according to claim 5, wherein
when the power switch of the mobile object is turned off while a connection in the first communication scheme is not established, the update control unit uses the at least one processor to control waiting for an establishment of the connection in the first communication scheme until a predetermined time for establishing the connection in the first communication scheme elapses.

15. The control system according to claim 2, wherein
if receiving the update program has not been completed within the predetermined time after the update control unit continues receiving the update program when the power switch of the mobile object is turned off, the update control unit uses the at least one processor to control stopping receiving the update program.

16. The control system according to claim 5, further comprising:
a charge control unit that uses the at least one processor to charge a battery for supplying electrical power used in updating the mobile object control unit with the update program when a destination of the mobile object is in an area where the first communication scheme can be used for communication.

17. A mobile object comprising the control system according to claim 1.

18. The mobile object according to claim 17, wherein the mobile object is a vehicle.

19. A control method comprising:
receiving an update program of a mobile object control unit to control a mobile object from a server remote from the mobile object, via a communication network, and instructing to update a control program of the mobile object control unit; and
when a power switch of a motor that drives the mobile object is turned off during receiving the update program, continuing receiving the update program, provided that receiving the update program is predicted to be completed within a predetermined time, and stopping receiving the update program if receiving the update program is predicted not to be completed within a predetermined time.

20. A non-transitory computer-readable storage medium storing a program, wherein the program is for causing a computer to function as:
a mobile object control unit that uses the computer to control a mobile object; and
an update control unit that uses the computer to control receiving an update program of the mobile object control unit from a server remote from the mobile object, via a communication network, and instructing to update a control program of the mobile object control unit,
wherein when a power switch of a motor that drives the mobile object is turned off during receiving the update program, the program causes the update control unit to:
continue receiving the update program, provided that receiving the update program is predicted to be completed within a predetermined time; and
stop receiving the update program if receiving the update program is predicted not to be completed within the predetermined time.

* * * * *